United States Patent [19]

Seo et al.

[11] Patent Number: 5,575,968

[45] Date of Patent: Nov. 19, 1996

[54] PROCESS FOR THE PREPARATION OF THERMOPLASTIC RESIN FILM

[75] Inventors: Jeong-Wook Seo, Suwon-si; Wan-Sup Shim, Kwachun-si; Hyo-Sup Kim, Suwon-si; Young-Jin Lee, Anyang-si, all of Rep. of Korea

[73] Assignee: SKC Limited, Kyungki-do, Rep. of Korea

[21] Appl. No.: 431,878

[22] Filed: May 1, 1995

[30] Foreign Application Priority Data

| May 6, 1994 | [KR] | Rep. of Korea | 94-9939 |
| May 6, 1994 | [KR] | Rep. of Korea | 94-9940 |
| May 6, 1994 | [KR] | Rep. of Korea | 94-9941 |
| May 6, 1994 | [KR] | Rep. of Korea | 94-9942 |

[51] Int. Cl.$^6$ .................... B29C 71/04; B29C 55/12
[52] U.S. Cl. .................. 264/481; 264/210.5; 264/235.8; 264/290.2; 264/342 RE; 264/346
[58] Field of Search ............... 264/235.8, 210.5, 264/290.2, 289.6, 342 RE, 235.6, 346, 481, 492, 476

[56] References Cited

U.S. PATENT DOCUMENTS

| 3,284,551 | 11/1966 | Yumoto et al. | 264/481 |
| 3,547,748 | 12/1970 | D'Onofrio t al. | 264/342 RE |
| 4,230,658 | 10/1980 | Matsukura et al. | 264/235.8 |
| 4,557,982 | 12/1985 | Nouda et al. | 428/694 |
| 4,677,188 | 6/1987 | Utsumi et al. | 264/235.8 |
| 4,684,487 | 8/1987 | Gawrisch | 264/235.8 |
| 5,158,637 | 10/1992 | Takashige et al. | 264/210.5 |
| 5,411,695 | 5/1995 | Yamada et al. | 264/235.8 |

FOREIGN PATENT DOCUMENTS

| 61-185430 | 8/1986 | Japan | 264/210.5 |
| 61-233523 | 10/1986 | Japan | 264/210.5 |
| 62-158016 | 7/1987 | Japan | 264/290.2 |
| 62-179920 | 8/1987 | Japan | 264/290.2 |
| 62-183328 | 8/1987 | Japan | 264/290.2 |
| 3-158225 | 7/1991 | Japan | 264/235.8 |

Primary Examiner—Jeffery R. Thurlow
Attorney, Agent, or Firm—Anderson, Kill, Olick

[57] ABSTRACT

A process for preparing a biaxially oriented thermoplastic resin film which comprises: extending a thermoplastic resin sheet in a longitudinal and a transverse directions to form a film thereof, and heat treating the film under a temperature gradient descending from both edges to the center of the film along the transverse direction within a zone defined by the following formula (1) by employing a heater which is located over the film with an angle $\theta$ of the following formula (3) from said both edges to the center of the film to produce a thermoplastic resin film having uniform physical and chemical properties in the transverse direction:

$$0.25 \leq L_1/W \leq 0.9 \qquad (1)$$

$$\tan\theta = W/2L_1 \qquad (3)$$

wherein:

$L_1$ is the distance from the end point of the transverse extending to the end point of the heat treating; and W is the total width of the film.

6 Claims, 2 Drawing Sheets

PROCESS FOR THE PREPARATION OF THERMOPLASTIC RESIN FILM

FIELD OF THE INVENTION

The present invention relates to a process for the preparation of a thermoplastic resin film having uniform physical and chemical properties by controlling the bowing of the film during a transverse extension and heat treating step.

BACKGROUND OF THE INVENTION

Thermoplastic resin films, especially those prepared from polyesters, have been widely used as condensers, packaging and labelling materials, photographic films, magnetic recording media and the like. For such various applications, it is desired that they have uniform physical and chemical properties in their transverse direction. When such film properties as heat shrinkage, mechanical strength and density are not uniform in the transverse direction, various difficulties are likely to occur in the further processing of the film, such as coating, deposition, slitting or printing, thereby deteriorating the quality of the film product. Therefore, numerous attempts have been made to produce a film having uniform physical and chemical properties in the transverse direction.

Thermoplastic resin films are generally prepared by a process of melting and extruding a thermoplastic polymer chip into an amorphous sheet, extending the sheet in longitudinal and transverse directions and then heat treating the extended film. In the process, the transverse extension and heat treating is carried out in a tenter and plays a critical role in maintaining the uniformity of the film properties in the transverse direction. In producing a film in accordance with the conventional methods, "bowing" of film tends to occur during the transverse extension and heat treating, which may cause a non-uniformity in the transverse directional properties thereof.

Said bowing refers to a phenomenon caused by a difference in the deformation between both edges and the center of the film being processed. That is, after a longitudinal extension, the film is extended along the transverse direction with its both edges held by, e.g., clips, and then heat treated. During the transverse extension and heat treatment, therefore, the edge areas of the film remain essentially intact due to the stability force of the clips, while the center of the film may be greatly deformed. Such difference in the degree of deformation depending on the transverse location of the film causes a bowing effect.

FIG. 1 shows such bowing effect of a film occurring during a transverse extension and heat treating process in a tenter. When the film, after being drawn in a transversely straight line, is extended in the transverse direction and heat treated, it is deformed in the shape of a bow as illustrated. In FIG. 1, b shows the extent of the deformation, W is the width of the film, and the arrow means the proceeding direction of the film. Such bowing effect results in the non-uniformity in the film properties along the transverse direction.

Consequently, extensive attempts have been made to prevent the bowing. For example, Japanese Patent Laid-open Publication No. 64-29214 describes a heat treatment by the use of heating rolls. In accordance with the process, however, both edges of the film are heat treated by heating rolls which are not firmly fixed or stabilized, thereby causing a shrinkage in the transverse direction.

Japanese Patent Laid-open Publication No. 67-9273 discloses a process of heat treating a film under a temperature gradient in the transverse direction; and Japanese Patent Laid-open Publication Nos. 87-183327 and 183328 offer the methods of heat treating a film with a heating gas, the flow rate (or amount) of which is different in the transverse direction. However, these methods have the disadvantages that require the use of complicated equipment and a substantial period for adjusting the conditions.

Japanese Patent Laid-open Publication No. 75-73978 presents a method including an additional heat treatment of a film with nip rolls between the transverse extending process and the heat treating process; and Japanese Patent Laid-open Publication No. 88-24459 discloses a method of heat treating while the center of the film is proceeded forcibly by nip rolls. These methods have the disadvantages in that the film may be damaged by the contact with the hot rolls.

Moreover, Japanese Patent Laid-open Publication Nos. 91-130126, 91-130127, 92-142916 and 92-142917 describe methods of inserting a cooling process after the transverse extension. However, these methods have limited effects, if any, while requiring the use of an additional apparatus.

SUMMARY OF THE INVENTION

It is, therefore, a primary object of the present invention to provide a process for preparing a biaxially oriented thermoplastic resin film having uniform physical and chemical properties in its transverse direction.

In accordance with the present invention, there is provided a process for preparing a biaxially oriented thermoplastic resin film which comprises extending a thermoplastic resin sheet in a longitudinal and a transverse directions to form a film thereof, and heat treating the film with a gradual heating from both edges to the center of the film along the transverse direction within a zone defined by the following formula (1):

$$0.25 \leq L_1/W \leq 0.9 \tag{1}$$

wherein:

$L_1$ is the distance from the end point of the transverse extending to the end point of the heat treating; and W is the total width of the film.

In accordance with the present invention, the film may be preferably re-extended in the transverse direction to an extent ranging from 1 to 5% during the heat treating. Further, it is preferable to quench the film to a temperature of $T_g$(glass transition temperature) or lower in the zone defined by the following formula (2), and/or to relax the film by a relaxation ratio of 2% or lower in the following formula (4):

$$L_2/W \leq 1.0 \tag{2}$$

$$L_3/W \leq 1.0 \tag{4}$$

wherein:

$L_2$ is the distance from the end point of the heat treating to the end point of quenching;

$L_3$ is the distance from the end point of the heat treating to the end point of relaxing; and W is the total width of the film.

DETAILED DESCRIPTION OF THE INVENTION

Figure 1:
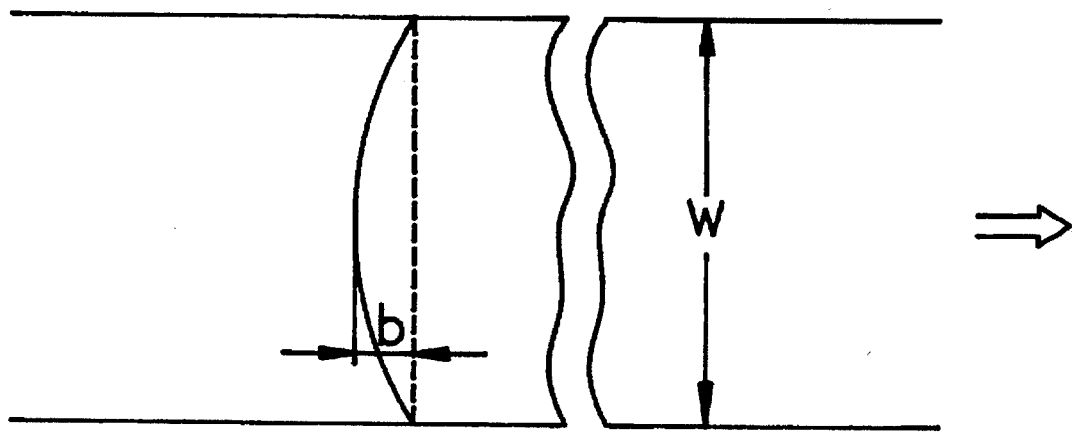
FIG. 1 shows a bowing effect of a film which occurs during a heat treating process.
Figure 2:
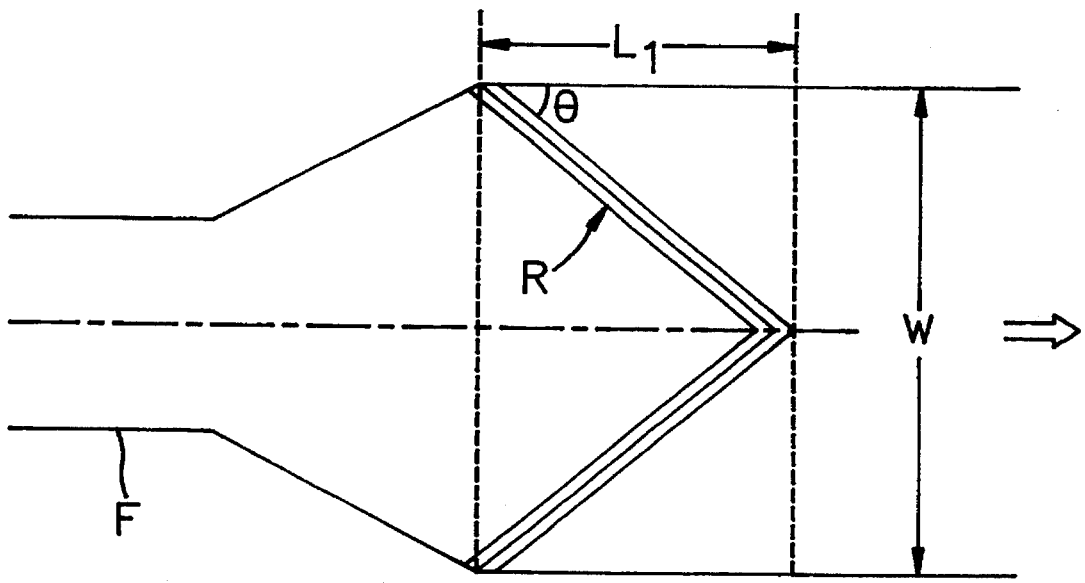
FIG. 2 illustrates an embodiment of a gradual heating during a heat treating process in accordance with the present invention.

FIG. 2 shows the preferred embodiment of employing a gradual heating from both sides to the center of a film along the transverse direction. An infrared heater (R) for heating the transversely extended film is located over the film with an angle θ of the following formula (3) from both sides to the center of the film:

$$\tan\theta = W/2L_1 \quad (3)$$

wherein, $L_1$ and W have the same meanings defined previously.

The longitudinally extended film (F) is extended in the transverse direction and then heat treated gradually from its edges or sides to the center in the transverse direction while progressing under the IR heater. The heat treatment of the film(F) in accordance with the present invention is carried out by a gradient heating so as to create a high temperature at both edges of film and a lower temperature at its center. In FIG. 2, $L_1$ represents the gradual heating zone, W is the total width of the film, and the arrow means the progressing direction of the film. The gradual heating may be controlled by changing the angle θ of the infrared heater within the zone defined by the above formula (1).

When the transversely extended film is heat treated with the gradual heating in accordance with the present invention, the longitudinal contraction stress of the film is gradually relieved from both edges to the center of the film, thereby reducing the bowing of the film.

During the heat treatment, re-extending the film in the transverse direction by an amount ranging from 1 to 5% may further decrease the longitudinal contraction, thereby further reducing the bowing effect. In addition, quenching the heat treated film to a temperature of $T_g$ or lower in the zone defined by formula (2) and/or relaxing the film by a relaxation ratio of 2% or lower in the zone defined by formula (4) is also preferable to reduce the bowing of the film.

Representative thermoplastic resins which may be applicable to the present invention include homopolyesters, copolyesters or mixed polyesters. Especially preferred are such polyesters as polyethylene terephthalate, polyethylene-2,6-naphthalate, polytetramethytene terephthalate, polytetramethylene-2,6-naphthalene carboxylate, liquid crystalline polyester, polypropylene, polyvinyl chloride, nylon, polyimide, polycarbonate, polystyrene and polyphenylenesulfite.

The following Examples are intended to illustrate the present invention more specifically, without limiting the scope of the invention.

In the Examples and Comparative Examples, the properties of the thermoplastic resin film were evaluated in accordance with the following methods.

The amount of bowing was calculated as follows:

$$B = b/W \times 100(\%)$$

wherein:
B is the amount of bowing(%);
b is the distance from the base line to the peak of the bow shape(mm); and
W is the width of the film (mm).

The variation of specific gravity of the film along the transverse direction was estimated in accordance with the following formula. The specific gravity was measured using a density gradient column method under the condition of ASTM D1505:

$$\text{variation of specific gravity in transverse direction of the film} = \frac{\text{(maximum-minimum) of specific gravity in transverse direction}}{\text{average value of specific gravity in transverse direction}}$$

The variation of thickness of the film along the transverse direction was estimated in accordance with the following formula (The thickness of the film was measured using a thickness measuring instrument from Winzen, U.S.A.):

$$\text{variation of thickness in transverse direction of the film} = \frac{\text{(maximum-minimum) of thickness in transverse direction}}{\text{average value of thickness in transverse direction}}$$

EXAMPLE 1-1

Polyethylene terephthalate chip having an intrinsic viscosity of 0.64 dl/g was melt-extruded through a die at 290° C. and quenched on a cooling roll at 20° C. to form an amorphous sheet having the thickness of 200 μm. The amorphous sheet was extended in a draw ratio of 3.5:1 in a longitudinal direction through the rolls which were maintained at about 100° C. Both edges of the longitudinally extended sheet was caught by clips and preheated at about 90° to 95° C. The preheated sheet was extended in a draw ratio of 4.5:1 in a transverse direction at about 110° to 120° C. The transversely extended sheet was heat treated for 3 seconds with hot air of 220° C. and an infrared heater having three components with a diameter of 20 mm, an electrical power of 30 kW and a surface temperature of 700° C., which is located with the angle θ of 30°, as shown in FIG. 2. Then, the heat treated film was exposed to the air to be cooled slowly to provide a biaxially oriented polyethylene terephthalate resin film having the thickness of 14 μm.

EXAMPLE 1-2

The procedure of Example 1-1 was repeated except that the angle θ was 45° to provide a biaxially oriented polyethylene terephthalate resin film.

EXAMPLE 1-3

The procedure of Example 1-1 was repeated except that the angle θ was 60° to provide a biaxially oriented polyethylene terephthalate resin film.

COMPARATIVE EXAMPLE 1-1

The procedure of Example 1-1 was repeated except that the angle θ was 90° to provide a biaxially oriented polyethylene terephthalate resin film.

COMPARATIVE EXAMPLE 1-2

The procedure of Example 1-1 was repeated except that the angle θ was 15° to provide a biaxially oriented polyethylene terephthalate resin film.

COMPARATIVE EXAMPLE 1-3

The procedure of Example 1-1 was repeated except that the angle θ was 75° to provide a biaxially oriented polyethylene terephthalate resin film.

COMPARATIVE EXAMPLE 1-4

The procedure of Example 1-1 was repeated except that the gradual heating starts 3 m away from the starting point of the heat treatment to provide a biaxially oriented polyethylene terephthalate resin film.

The amount of bowing and variation of specific gravity in a transverse direction of each film were measured and the results were shown in Table 1.

TABLE 1

| | starting point of gradual heating in transverse direction | zone of gradual heating in transverse direction ($L_1/W$) | amount of bowing (%) | variation of specific gravity in transverse direction |
| --- | --- | --- | --- | --- |
| Ex. 1-1 | immediately after transverse extending | 0.866 | 4.2 | 0.07 |
| Ex. 1-2 | immediately after transverse extending | 0.5 | 4.5 | 0.07 |
| Ex. 1-3 | immediately after transverse extending | 0.287 | 4.8 | 0.05 |
| Com. Ex. 1-1 | X | 0 | 6.1 | 0.1 |
| Com. Ex. 1-2 | immediately after transverse extending | 1.866 | 5.3 | 0.15 |
| Com. Ex. 1-3 | immediately after transverse extending | 0.134 | 5.6 | 0.09 |
| Com. Ex. 1-4 | 3 m away from end point of transverse extending | 0.866 | 5.7 | 0.08 |

EXAMPLE 2-1

The procedure of Example 1-1 was repeated to provide an amorphous polyethylene terephthalate sheet. The sheet was extended in longitudinal and transverse directions and then, heat treated in the same manner of Example 1-1. During heat treating, the film was subjected to re-extending in the transverse direction in a ratio of 1.02:1, and then was exposed to the air to be cooled slowly to provide a biaxially oriented polyethylene terephthalate resin film having the thickness of 14 μm.

EXAMPLE 2-2

The procedure of Example 2-1 was repeated except that the angle θ was 45° to provide a biaxially oriented polyethylene terephthalate resin film.

EXAMPLE 2-3

The procedure of Example 2-1 was repeated except that the angle θ was 60° to provide a biaxially oriented polyethylene terephthalate resin film.

COMPARATIVE EXAMPLE 2-1

The procedure of Example 2-1 was repeated except that the angle θ was 90° to provide a biaxially oriented polyethylene terephthalate resin film.

COMPARATIVE EXAMPLE 2-2

The procedure of Example 2-1 was repeated except that the angle θ was 15° to provide a biaxially oriented polyethylene terephthalate resin film.

COMPARATIVE EXAMPLE 2-3

The procedure of Example 2-1 was repeated except that the angle θ was 75° to provide a biaxially oriented polyethylene terephthalate resin film.

The amount of bowing and variation of specific gravity and thickness in a transverse direction of each film were measured and the results were shown in Table 2.

TABLE 2

| | zone of gradual heating in transverse direction ($L_1/W$) | amount of bowing (%) | variation of specific gravity in transverse direction | variation of thickness in transverse direction |
| --- | --- | --- | --- | --- |
| Ex. 2-1 | 0.866 | 3.8 | 0.06 | 2.8 |
| Ex. 2-2 | 0.5 | 3.9 | 0.06 | 2.7 |
| Ex. 2-3 | 0.287 | 4.0 | 0.04 | 2.3 |
| Com. Ex. 2-1 | 0 | 6.1 | 0.1 | 3.5 |
| Com. Ex. 2-2 | 1.866 | 5.3 | 0.15 | 3.0 |
| Com. Ex. 2-3 | 0.134 | 5.6 | 0.09 | 2.9 |

EXAMPLE 3-1

The procedure of Example 1-1 was repeated to provide an amorphous polyethylene terephthalate sheet. The sheet was extended in longitudinal and transverse directions, and then heat treated in the same manner of Example 1-1. During heat treating, the film was subjected to re-extending in the transverse direction in a ratio of 1.02:1 (i.e. 2%), and then quenched with the cold air of 25° C. for 1 second to provide a biaxially oriented polyethylene terephthalate resin film having the thickness of 14 μm.

EXAMPLE 3-2

The procedure of Example 3-1 was repeated except that the angle θ was 45° to provide a biaxially oriented polyethylene terephthalate resin film.

EXAMPLE 3-3

The procedure of Example 3-1 was repeated except that the angle θ was 60° to provide a biaxially oriented polyethylene terephthalate resin film.

EXAMPLE 3-4

The procedure of Example 3-1 was repeated except that re-extending the film in the transverse direction was carried out in a ratio of 1.05:1 (i.e., 5%) to provide a biaxially oriented polyethylene terephthalate resin film.

EXAMPLE 3-5

The procedure of Example 3-1 was repeated except that the transversely re-extended film was quenched with the air of 50° C. to provide a biaxially oriented polyethylene terephthalate resin film.

COMPARATIVE EXAMPLE 3-1

The procedure of Example 3-1 was repeated except that the angle θ was 90° to provide a biaxially oriented polyethylene terephthalate resin film.

COMPARATIVE EXAMPLE 3-2

The procedure of Example 3-1 was repeated except that the angle θ was 15° to provide a biaxially oriented polyethylene terephthalate resin film.

COMPARATIVE EXAMPLE 3-3

The procedure of Example 3-1 was repeated except that the angle θ was 75° to provide a biaxially oriented polyethylene terephthalate resin film.

COMPARATIVE EXAMPLE 3-4

The procedure of Example 3-1 was repeated except that the transversely re-extended film was quenched with air of 70° C. to provide a biaxially oriented polyethylene terephthalate resin film.

COMPARATIVE EXAMPLE 3-5

The procedure of Example 3-1 was repeated except that re-extending the film in the transverse direction was carried out in a ratio of 1.1:1 (i.e., 10%) to provide a biaxially oriented polyethylene terephthalate resin film.

The amount of bowing and variation of specific gravity and thickness in a transverse direction of each film were measured and the results were shown in Table 3.

TABLE 3

| | zone of gradual heating in transverse direction ($L_1/W$) | zone of quenching after heat treating ($L_2/W$) | amount of bowing (%) | variation of specific gravity in transverse direction | variation of thickness in transverse direction |
|---|---|---|---|---|---|
| Ex. 3-1 | 0.866 | <1 | 3.8 | 0.06 | 2.8 |
| Ex. 3-2 | 0.5 | <1 | 3.9 | 0.06 | 2.7 |
| Ex. 3-3 | 0.287 | <1 | 4.0 | 0.04 | 2.3 |
| Ex. 3-4 | 0.866 | <1 | 3.5 | 0.06 | 2.9 |
| Ex. 3-5 | 0.866 | <1 | 3.9 | 0.06 | 2.8 |
| Com. Ex. 3-1 | 0 | <1 | 6.1 | 0.1 | 3.5 |
| Com. Ex. 3-2 | 1.866 | <1 | 5.3 | 0.15 | 3.0 |
| Com. Ex. 3-3 | 0.134 | <1 | 5.6 | 0.09 | 2.9 |
| Com. Ex. 3-4 | 0.866 | 1< | 5.5 | 0.07 | 3.3 |
| Com. Ex. 3-5 | 0.866 | <1 | 3.2 | 0.06 | 5.5 |

EXAMPLE 4-1

The procedure of Example 1-1 was repeated to provide an amorphous polyethylene terephthalate sheet. The sheet was extended in longitudinal and transverse directions, and then heat treated in the same manner of Example 1-1. During heat treating, the film was subjected to re-extending in the transverse direction in a ratio of 1.02:1 (i.e. 2%), and then quenched with the cold air of 25° C. for 1 second and relaxed by the relaxation rate of 1% to provide a biaxially oriented polyethylene terephthalate resin film having the thickness of 14 μm.

EXAMPLE 4-2

The procedure of Example 4-1 was repeated except that the angle θ was 45° to provide a biaxially oriented polyethylene terephthalate resin film.

EXAMPLE 4-3

The procedure of Example 4-1 was repeated except that the angle θ was 60° to provide a biaxially oriented polyethylene terephthalate resin film.

EXAMPLE 4-4

The procedure of Example 4-1 was repeated except that re-extending the film in the transverse direction was carried out in a ratio of 1.05:1 (i.e., 5%) to provide a biaxially oriented polyethylene terephthalate resin film.

EXAMPLE 4-5

The procedure of Example 4-1 was repeated except that the transversely re-extended film was quenched with the air of 50° C. to provide a biaxially oriented polyethylene terephthalate resin film.

COMPARATIVE EXAMPLE 4-1

The procedure of Example 4-1 was repeated except that the angle θ was 90° to provide a biaxially oriented polyethylene terephthalate resin film.

COMPARATIVE EXAMPLE 4-2

The procedure of Example 4-1 was repeated except that the angle θ was 15° to provide a biaxially oriented polyethylene terephthalate resin film.

COMPARATIVE EXAMPLE 4-3

The procedure of Example 4-2 was repeated except that the angle θ was 75° to provide a biaxially oriented polyethylene terephthalate resin film.

COMPARATIVE EXAMPLE 4-4

The procedure of Example 4-3 was repeated except that the transversely re-extended film was quenched with the air of 70° C. to provide a biaxially oriented polyethylene terephthalate resin film.

COMPARATIVE EXAMPLE 4-5

The procedure of Example 4-4 was repeated except that re-extending the film in the transverse direction was carried out in a ratio of 1.1:1 (i.e., 10%) to provide a biaxially oriented polyethylene terephthalate resin film.

COMPARATIVE EXAMPLE 4-6

The procedure of Example 4-1 was repeated except that the quenched film was relaxed by the relaxation ratio of 3% to provide a biaxially oriented polyethylene terephthalate resin film.

The amount of bowing and variation of specific gravity and thickness in a transverse direction of each film were measured and the results were shown in Table 4.

TABLE 4

|  | zone of gradual heating in transverse direction ($L_1/W$) | zone of quenching after heat treating ($L_2/W$) | amount of bowing (%) | variation of specific gravity in transverse direction | variation of thickness in transverse direction |
| --- | --- | --- | --- | --- | --- |
| Ex. 4-1 | 0.866 | <1 | 3.7 | 0.06 | 2.8 |
| Ex. 4-2 | 0.5 | <1 | 3.8 | 0.06 | 2.7 |
| Ex. 4-3 | 0.287 | <1 | 3.9 | 0.04 | 2.3 |
| Ex. 4-4 | 0.866 | <1 | 3.4 | 0.06 | 2.9 |
| Ex. 4-5 | 0.866 | <1 | 3.8 | 0.06 | 2.8 |
| Com. Ex. 4-1 | 0 | <1 | 6.0 | 0.1 | 3.5 |
| Com. Ex. 4-2 | 1.866 | <1 | 5.2 | 0.15 | 3.0 |
| Com. Ex. 4-3 | 0.134 | <1 | 5.5 | 0.09 | 2.9 |
| Com. Ex. 4-4 | 0.866 | 1< | 5.4 | 0.07 | 3.3 |
| Com. Ex. 4-5 | 0.866 | <1 | 3.1 | 0.06 | 5.5 |
| Com. Ex. 4-6 | 0.866 | <1 | 4.1 | 0.07 | 4.3 |

As clearly shown in Tables 1 to 4, the amount of bowing and variation of specific gravity and thickness along the transverse direction of each film prepared in accordance with the present invention are markedly reduced.

The biaxially oriented thermoplastic resin films prepared in accordance with the inventive process have uniform physical and chemical properties such as specific gravity and thickness in the transverse direction.

While the invention has been described with respect to the above specific embodiments, it should be recognized that various modifications and changes may be made within the scope of the invention as defined by the claims that follow.

What is claimed is:

1. A process for preparing a biaxially oriented thermoplastic resin film which comprises extending a thermoplastic resin sheet in a longitudinal and a transverse directions to form a film thereof, and heat treating the film with a gradient heating capable of creating a descending temperature gradient from both edges to the center of the film along the transverse direction within a zone defined by the following formula (1) by employing a heater which is located over the film with an angle θ of the following formula (3) from said both edges to the center of the film:

$$0.25 \leq L_1/W \leq 0.9 \quad (1)$$

$$\tan\theta = W/2L_1 \quad (3)$$

wherein:

$L_1$ is the distance from the end point of the transverse extending to the end point of the heat treating; and W is the total width of the film.

2. The process of claim 1, which further comprises re-extending the film in the transverse direction within a range from 1 to 5% during the heat treating.

3. The process of claim 1, which further comprises quenching the film to the temperature of $T_g$ or lower after the heat treating in a zone defined by the following formula (2):

$$L_2/W \leq 1.0 \quad (2)$$

wherein:

$L_2$ is the distance from the end point of the heat treating to the end point of quenching; and W has the same meaning as defined in claim 1.

4. The process of claim 2, which further comprises quenching the film to the temperature of $T_g$ or lower after the heat treating in a zone defined by the following formula (2):

$$L_2/W \leq 1.0 \quad (2)$$

wherein:

$L_2$ and W have the same meanings as defined in claim 3.

5. The process of claim 1, which further comprises relaxing the film by a relaxation ratio of 2% or lower after the heat treating in a zone defined by the formula (4):

$$L_3/W \leq 1.0 \quad (4)$$

wherein:

$L_3$ is the distance from the end point of the heat treating to the end point of relaxing; and W has the same meaning as defined in claim 1.

6. The process of claim 4, which further comprises relaxing the film by a relaxation ratio of 2% or lower after the heat treating in a zone defined by the formula (4):

$$L_3/W \leq 1.0 \quad (4)$$

wherein:

$L_3$ and W have the same meanings as defined in claim 5.

* * * * *